US006930794B2

(12) United States Patent
Vial et al.

(10) Patent No.: US 6,930,794 B2
(45) Date of Patent: Aug. 16, 2005

(54) METHOD AND DEVICE FOR THE GENERATION OF PRINTED GRAPHIC PATTERNS FOR EXHIBITING MOVIE PICTURES TO MOVING OBSERVERS BY MEANS OF A STATIC OPTICAL APPARATUS

(75) Inventors: Enrique Vial, Santiago (CL); Miguel Lagos, Santiago (CL)

(73) Assignee: Optek S.A., Santiago (CL)

( * ) Notice: Subject to any disclaimer, the term of this patent is extended or adjusted under 35 U.S.C. 154(b) by 144 days.

(21) Appl. No.: 10/372,661

(22) Filed: Feb. 25, 2003

(65) Prior Publication Data

US 2004/0165217 A1 Aug. 26, 2004

(51) Int. Cl.[7] ................................................ G06F 15/00

(52) U.S. Cl. .................... 358/1.17; 358/1.16; 358/1.18; 358/1.1; 358/507

(58) Field of Search .............................. 358/1.18, 1.17, 358/1.16, 1.1, 507, 296, 462, 471, 474, 443, 444, 446; 396/330; 440/454, 437, 539

(56) References Cited

U.S. PATENT DOCUMENTS 1,475,430 A 11/1923 Curwen ....................... 40/454
2,832,593 A 4/1958 Anderson .................... 472/70
4,506,296 A 3/1985 Marraud et al. .............. 348/59
4,542,958 A 9/1985 Young ........................ 359/627
4,663,871 A 5/1987 Young ......................... 40/454
4,870,768 A * 10/1989 Watt et al. .................... 40/430
4,944,572 A 7/1990 Young ........................ 359/619
5,704,061 A * 12/1997 Anderson .................. 396/330
5,859,957 A 1/1999 Enrique et al. ............ 358/1.17
6,493,972 B1 * 12/2002 Williams ..................... 40/454
6,748,684 B1 * 6/2004 Bar-Yona ..................... 40/454

* cited by examiner

*Primary Examiner*—Twyler Lamb
(74) *Attorney, Agent, or Firm*—Schlesinger, Arkwright & Garvey LLP

(57) ABSTRACT

A method for generating printed images of a graphic pattern of a movie picture to be displayed for moving observers using a long display panel composed of the graphic pattern and a plate made up of a plurality of cylinder converging lenses arranged parallel to each other with a common focal plane. A digital storage device able to store a plurality of data or digital information blocks, corresponding to the images to be exhibited, for example, the sequence of frames of a movie picture encoded in a digital format is provided. Each block has a label that determines its correlative order in the set. A digital processing unit and memory, able to call, read and process the digital data blocks, is provided that can also create and send to the storage device new data blocks, or byte arrays, containing the graphical patterns in digital format.

7 Claims, 5 Drawing Sheets

METHOD AND DEVICE FOR THE GENERATION OF PRINTED GRAPHIC PATTERNS FOR EXHIBITING MOVIE PICTURES TO MOVING OBSERVERS BY MEANS OF A STATIC OPTICAL APPARATUS

BACKGROUND OF THE INVENTION

1. Field of the Invention

The present invention relates to a method and devices for the production of printed graphic patterns which project an image that follows the motion of the observer, irrespective of its speed, when placed in the common focal plane behind a lenticular plate made of a plurality of cylindrical converging lenses, arranged side by side and parallel to each other. If the panel composed of the two objects, that is, the properly prepared graphic pattern and the lenticular plate, is long enough, a movie picture can be exhibited to the observer travelling along the principal direction.

2. Description of the Related Art

There is a number of optical effects and devices associated with the combination of a graphic pattern and a lenticular screen made of a plurality of cylindrical converging lenses arranged side by side, parallel each other, and with a common focal plane.

A well-known class of this sort of optical apparatuses is derived from the early invention of J. S. Curwen, U.S. Pat. No. 1,475,430, issued in Feb. 27, 1922. These devices are used either to exhibit a sequence of a limited number of pictures that change when the viewing angle relative to the apparatus varies, or to display stereoscopic images. The exhibition of a short animation, or the stereoscopic image of a rotating object, are direct applications of the same basic idea. Examples of related issued patents are U.S. Pat. Nos. 2,832,593, 4,506,296, 4,542,958, 4,663,871 and 4,944,572.

This first class of display panels are not related to the present invention, but it was mentioned and is briefly described in the next paragraph just to stress the essential difference they have with a second class of devices, which do relate with the invention and are explained later on.

What the devices of the first kind have in common is a graphic pattern composed by a limited number n of lineated images, all them made of the same number of parallel straight lines, as high as necessary to have an acceptable graphic resolution in the direction transverse to the straight lines forming the picture. The graphic pattern is an ordered mixture of the lines of all the lineated figures, which locates first the first lines of all the figures, in the correlative order chosen for the n images of the set, next come the second lines in the same order, and so on. The optical screen is placed in front, at the focal distance of the cylindrical lenses, with the lenses parallel to the pattern lines. Each lens of the screen has a set of n lines behind, one from each of the n images. Because of the high transverse optical amplification, the observer will see only one line in each lens, the rest of the lines falling beyond the limits of the lens field. The observer is usually at a distance much larger than the dimensions of the display panel and, as the viewing angular position with respect to the plane of the screen is almost the same for all lenses, the lines displayed by all them correspond to the same figure. Hence the global effect is that the screen selects and exhibits the lines of only a single image, which becomes displayed. This selective effect is governed by the angular position of the observer. As this angle changes the displayed image changes as well. If each pair of contiguous pictures of the set correspond to the right and left eye vision of the same object, respectively, the panel will display stereoscopic images.

The present invention is related to a different class of exhibiting panels constituted by a graphic pattern and a lenticular plate made of a plurality of cylindrical converging lenses arranged side by side and parallel to each other, with a common focal plane. This second kind of exhibiting panels is much less known than the first one and yields a very different optical effect. The essential differences are in the graphic structure of the printed pattern, the function fulfilled by the eyes of the observers and some practical requirements on the dimension of the elements of the system. The seminal patent was issued to A. J. L. Ossoinak, U.S. Pat. No. 2,833,176, in May 6, 1958. A further application was patented in 1971 by E. J. Smith, U.S. Pat. No. 3,568,346. Exhibiting panels of this second class are preferably very long in the direction along the plate transverse to the geometrical axis of the cylindrical lenses or, equivalently, transverse to the generatrix of the cylindrical surfaces of the lenses. Hereafter the transversal direction will be referred to as the principal direction. Any person facing the panel will see an image directly in front, no matter the position. If the viewer moves along the principal direction the image will always stay in front, following the motion of the observer, irrespective of its speed. The system is particularly suited for exhibiting movie pictures to moving observers. Examples are train or tramway passengers, with the display panel installed along the vehicle path, and people in mechanical escalators or corridors.

However, during the life of Ossoinak patent, its commercial application to exhibit movie pictures to passengers of public transportation was prevented by the high production costs of the graphic patterns. The present invention takes advantage of the more recent technology to solve this inconvenience.

The graphic pattern is located in the focal plane behind the lenticular plate and the viewer is in front of the plate. The pattern is composed of a series of printed figures, in general repeated identically $N_{rep}$ times. Each of the printed figures is a copy of the same picture that will be exhibited but compressed in the principal direction, that is, the dimension of the lenticular plate transverse to the geometrical axis of the cylindrical surfaces of the lenses. The graphic compression is such that the distorted figures have at most the same width of a cylindrical lens. This way, each cylindrical lens has behind it a complete figure of the graphic pattern. FIG. 1 shows the construction of the system and how it works in a subjective way. FIG. 2 shows a further explanation of the optical bases of the second kind of devices.

The system will work equally well if the lenticular plate is made of a two-dimensional array of spherical lenses, instead of a linear succession of cylindrical lenses. However, for most applications the use of spherical lenses is less practical because the displayed picture will follow the viewer's displacements in both dimensions of the panel (along the principal direction and along the perpendicular to the principal direction). This may be a problem if the panel is not large enough in the not principal direction. Nonetheless, two-dimensional graphic patterns and lenticular plates of spherical lenses are considered as an extension of the cylindrical lenticular plates.

The exhibiting panel displays the picture contained in the fringes of the graphic pattern with the principal dimension (for example, width) expanded to the normal size in relation to the other dimension (for example, height) of the picture. The observed picture follows the motion of a viewer moving at any speed in the principal direction. If after each $N_{rep}$ repetitions of a compressed image in the graphic pattern the image is changed to the next frame of a cinematographic sequence, the moving observer will see an animated scene in the panel.

The present invention is concerned with the production of graphic patterns for the practical use of the just described class of devices for exhibiting movie pictures to moving people by means of a large apparatus at rest, with reasonable costs.

The present invention uses a combination of powerful computers, digital picture processing, electronic devices for the efficient conversion of movies in video or film substrates into sequences of digital images, and large high resolution printing machines for digital images.

SUMMARY OF THE INVENTION

The present invention is a method for allowing the low cost production of graphic patterns for the practical use of what is called here the second class of exhibiting panels, described in FIGS. 1 and 2, for exhibiting movie pictures to moving people by means of a large apparatus at rest.

The method and device of the invention includes:

(a) A digital storage device able to store a plurality of data or digital information blocks, corresponding to the images to be exhibited, for example, the sequence of frames of a movie picture encoded in a digital format. Each block has a label that determines its correlative order in the set.

(b) A digital processing unit and memory, which have the means to call, read and process the digital data blocks. It can also create and send to the storage device new data blocks, or byte arrays, containing the graphical patterns in digital format.

(c) A program, or succession of elementary digital inputs, instructing the processing unit to perform operations on the original data blocks and create new output data blocks constituting the graphical pattern in digital code.

A long display panel for exhibiting movie pictures to traveling viewers should be necessarily constituted by a series of modular units, installed side by side along the observer's path. Hence the graphic pattern must be constituted also by a series of units, printed in paper, or other substrate, one for each panel modular unit. Each of the printed units will be called hereafter a page of the graphic pattern. The total number of pages will be denoted $N_{pages}$, the total number of different images, or data blocks, is $N_{frames}$ and the number of lenses in the lenticular plate of a panel modular unit is $N_{lenses}$.

Therefore, the digital procedure of the invention distorts each input image to a fringe of the geometrical proportions and size of an individual lens and distribute, in the right correlative order, these $N_{frames}$ fringes in the $N_{pages}$ pages repeating each one $N_{rep}$ times. A page has room for just $N_{lenses}$ fringes, including repetitions. None of these numbers are necessarily commensurate.

The procedure creates first a blank page, or byte array, defines a uniform configuration for the bytes to establish the background color, and divides the principal dimension of the array into $N_{lenses}$ equivalent intervals which, in turn, separates the array into $N_{lenses}$ sectors, or fringes, ordered along the principal dimension. Then the digital data blocks of the images are called successively in the correlative order determined by their labels. If necessary to fit a byte fringe, a sub-routine of the procedure resizes and distorts each digital image directly after call. After resizing, each digital image is pasted repeatedly in $N_{rep}$ adjacent fringes, starting from the last one not occupied. When the $N_{lenses}$ byte fringes are filled the page is closed, numbered, labeled with a digital label containing its correlative number and stored. A new blank page is then created and the procedure restarts. If the set of $N_{rep}$ repetitions of the last called figure was not completed before closing the previous page, filling of the new page fringes starts with the last called digital figure to complete the set of $N_{rep}$ repetitions. The next digital image is called otherwise. Before printing, a new resize operation may be necessary to bring the page width to height ratio to the right value.

The number of repetitions $N_{rep}$ of the fringes associated to each frame of a movie picture is determined by the speed at which the viewer passes in front of the corresponding modular unit panel. For example, if the movie was taken from video signal, which usually works at 30 frames/second, each frame must be exhibited for 1/30 second to the viewer. Hence the space of the graphic pattern occupied by repeated fringes is the distance traveled by the observer in 1/30 second. If the observers are in a vehicle whose speed varies, $N_{rep}$ should be varied as well, according to the speed profile of the vehicle.

DESCRIPTION OF THE DRAWINGS

In order to understand the invention better, the same will be explained with the support of the following figures and sketches, where.

DETAILED DESCRIPTION OF THE INVENTION

Figure 1:
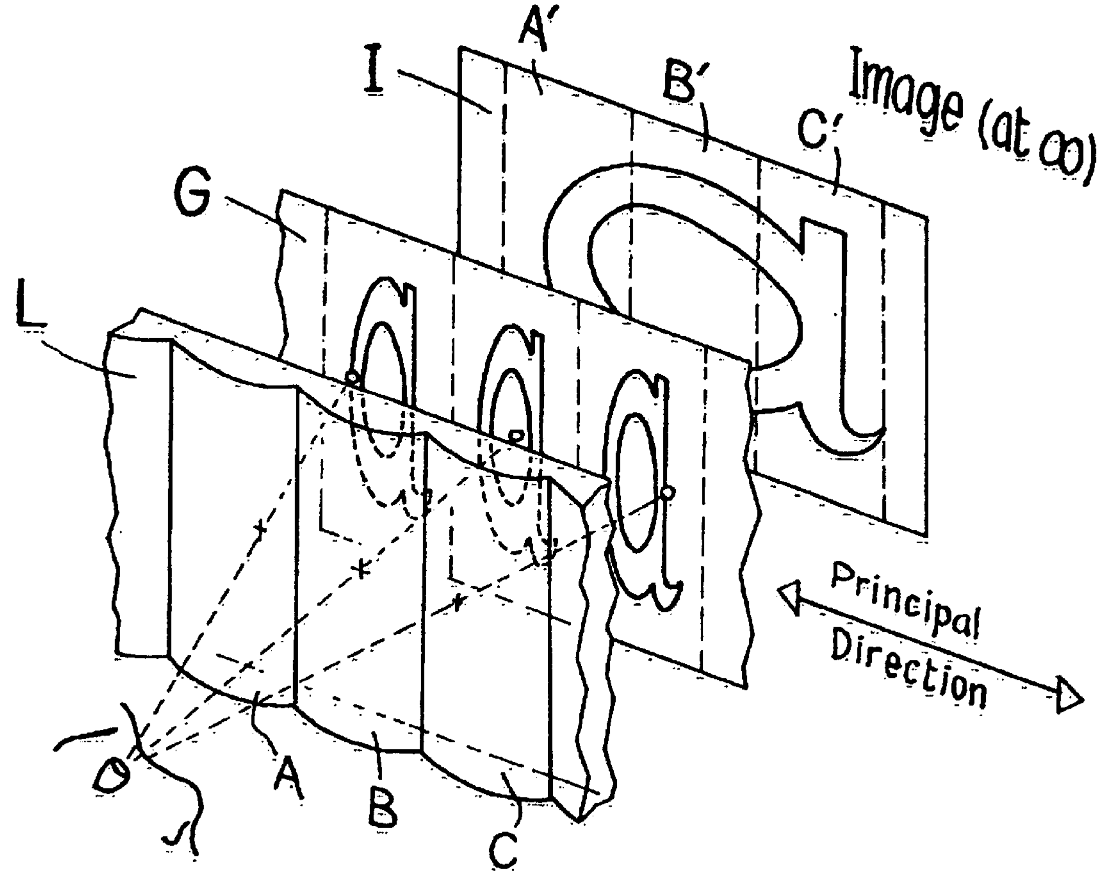
FIG. 1 shows a subjective explanation of how an exhibiting panel of the prior art works, which uses graphic patterns which may be elaborated with the method and device of the invention. The viewer observes a periodic graphic object G through a lenticular plate L, made of a plurality of cylindrical converging lenses, parallel to each other and with a common focal plane. The period of the graphic pattern G is equal to the width of a cylindrical lens of the plate L. The individual lenses A, B, C, . . . display to the viewer images A', B', C', . . . of the same graphic object expanded in the principal direction. Because of the narrow field of the lenses, individual images A', B', C', . . . are only fringes of the same expanded image, centered in different points of it. If f is the focal distance then A', B', C', . . . merge into the complete image I expanded in the principal dimension.
Figure 2:
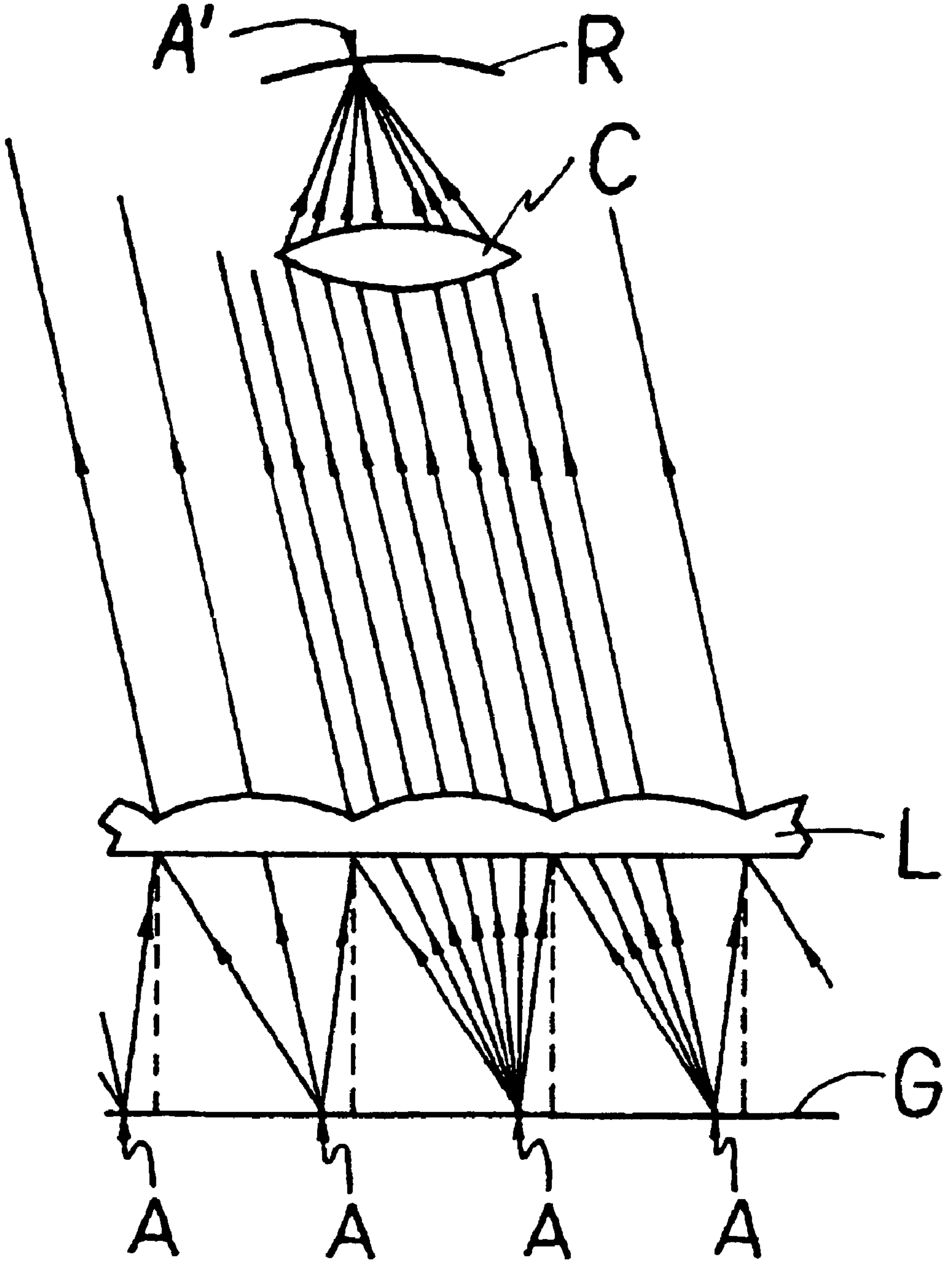
FIG. 2 gives a further optical explanation of the exhibiting panel of the prior art depicted in FIG. 1. The points P of the periodic graphic pattern G denote equivalent vertical lines of the repeated compressed scene. As G is in the focal plane of the lenses of the plate L, light beams emerging from any of the lines A are deflected by the cylindrical lens in front into parallel planes. If the eye E of the observer focuses to infinity, the parallel light planes are projected by the crystalline lens C into a single line A', reproducing A, on the retina R. It becomes apparent from the figure that the effect does not depend on the position of the observer. As the eye focuses to infinity, some astigmatism would occur in the internal graphic structure of the line. This problem, however, is avoided if L is made of spherical lenses, instead of cylindrical ones.
Figure 3:
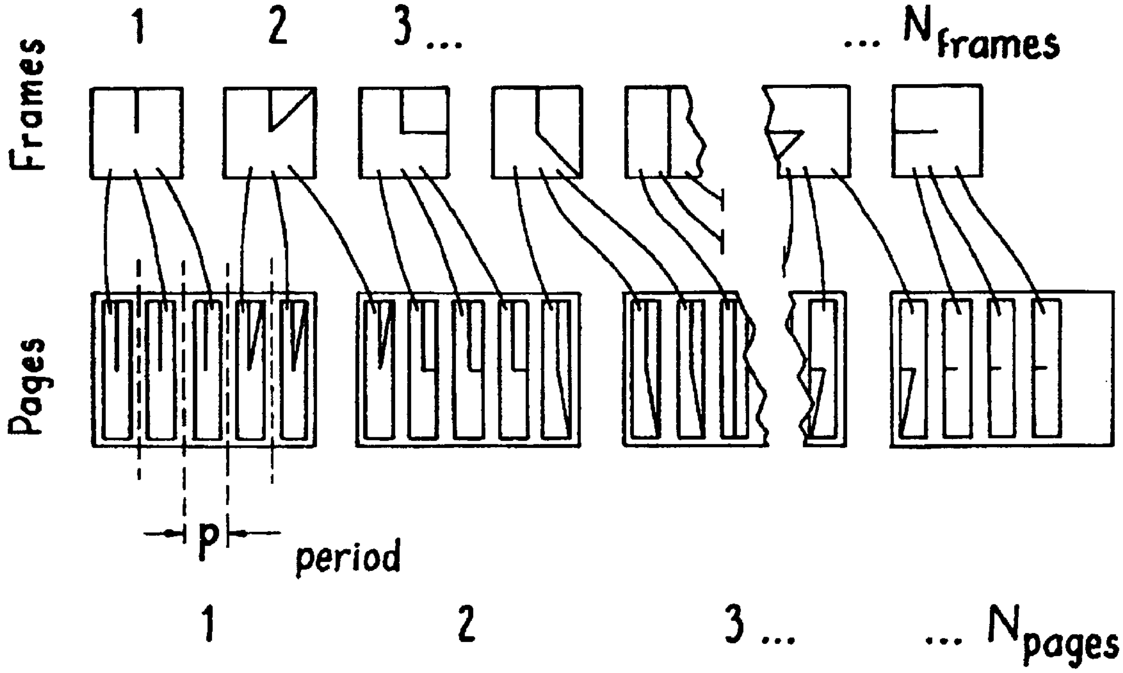
FIG. 3 depicts the general structure of the graphic pattern and notation for the parameters.

FIGS. 1 and 2 explain the class of exhibiting panel of the prior art and shall serve to explain the structure of the graphic patterns which are elaborated through the procedure and device of the invention. The exhibiting panel of this example consists of a multilenticular plate L, formed by a plurality of cylindrical converging lenses arranged parallel to each other, which define a common focal plane. In the focal plane is located a graphic pattern G, formed by a plurality of printed fringes, each one representing a distorted picture, graphically compressed along the principal direction to fit the size and shape of the individual cylindrical lens of the lenticular plate L disposed in front. The observer, assumed in motion along the principal direction, sees an image I at infinity, which reproduces the picture contained in an individual compressed picture of the graphic pattern G but expanded in the principal direction. The image I follows the motion of the viewer and stays always in front.

The size in the principal direction (hereafter width) of the viewed image I is expanded to $$W = \frac{D}{f} w,$$

where D is the distance of the observer to the lenticular plate, f is the focal distance of the cylindrical lenses and w the size in the principal direction (hereafter width) of an individual compressed scene, or fringe, printed in the graphic pattern.

If the compressed picture constituting the fringes of the graphic pattern changes periodically, following the succession of frames of a movie picture, the observer in motion along the principal direction will see an animated scene in the panel. If the movie was filmed at n frames per second each frame must be exhibited for 1/n seconds to the moving observer. Therefore, the number of fringes of the graphic pattern containing a particular compressed frame of the film must be $$N_{rep} = \frac{v}{np},$$

where v is the velocity of the observer and p the distance between fringes in the graphic pattern (or lenses in the lenticular plate).

In this manner, the viewer sees a complete coherent image when all active fringes in a space W of the graphic pattern correspond to the same frame. Because of the motion of the observer the image changes and the new one enters from one side, as a curtain that gradually covers gradually a scene.

Figure 5:
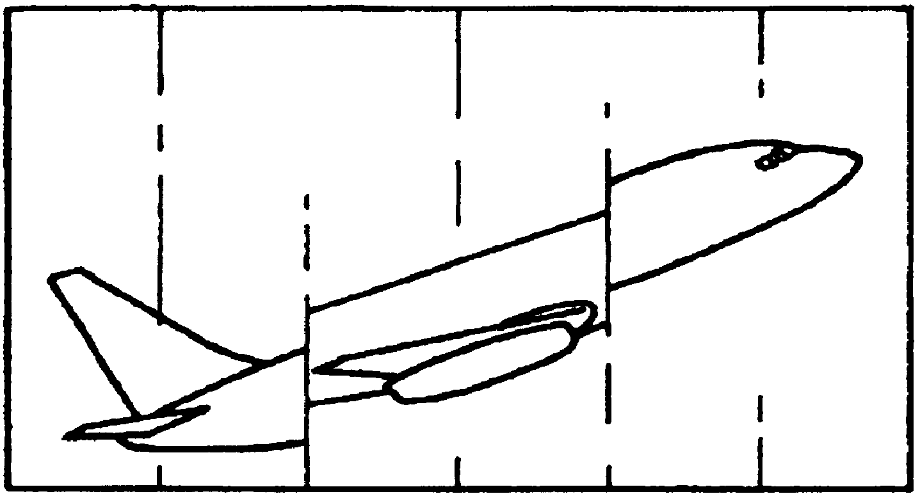
FIG. 5 shows an example of the mixing of different subsequent frames of a movie picture occurring when $N_{rep}$ is not large enough.

Experiment has shown a very interesting effect that has useful applications, which were not described or claimed in any previous issued patent, to the awareness of the authors. If the velocity v of the observer is low, and the distance D to the panel is large enough, the width W of the viewed image may be larger than the longitude $N_{rep}p$ assigned to a single frame of the movie. In this case the viewed image will mix parts of different frames. FIG. 5 shows an example of such situation. In this example the width of the viewed image is about three times the space of the graphic pattern assigned to fringes repeating each frame. Amazingly, the empirical fact is that this undesired effect is notorious only when the observer is almost at rest. Walking speed is enough to view a coherent animated scene when the image mixes as many as four consecutive movie frames.

This can be understood recalling that vision is not only an optical phenomenon, but also demands elaborate brain processing. The perception of a moving scene is particularly complex. The very majority of the light receptors are concentrated in a small region of the retina (phobia) and detailed attention is paid only to a small part of the entire sight angle. It seems that a subject facing an evolving environment concentrates successively in different sectors of the scene. The whole perception results from composing in mind a collage of the partial sectors brought to present by a time extrapolation. The mechanism allows one, for instance, to circulate in a crowded hall of busy people without pulling others. This may serve to explain why the complex image of the previous paragraph, mixing fringes of the same scene in different times, is perceived without any mixing when becomes animated. It seems that the brain processor is naturally able to extrapolate the different sectors in time to construct a scene evolving coherently.

The invention deals with the production of the graphic pattern by means of a digital procedure and devices at a cost that permits the exhibition of movie pictures to moving people, in public areas, by means of a large apparatus at rest. The input movie can be converted into a sequence of $N_{frames}$ digital images by means of a convenient standard apparatus and stored in a digital electronic storage device.

A digital image essentially is a two-dimensional byte array. The elements of the array are labeled by an ordered pair of numbers and are constituted by a set of one, three or more bytes. When the digital image is printed, or viewed in an electronic screen, the two numbers labeling the elements of the array establish the horizontal and vertical coordinates of a pixel, or color spot. The color of a pixel is determined by the digital configuration of the bytes constituting the element of the array. In the usual nomenclature, a byte is a set of eight bits, and a bit is a binary object that can be set to 0 or 1. Hence a byte has 256 possible configurations. Anyway, one can generalize this convention and define the byte as a collection of any definite number of bits.

A color pixel can be realized, for example, as a set of three bytes, the bit configuration of each byte determining the intensity of one of the three basic colors in the range 0–255. Alternatively, simply a single byte may define a pixel if a palette of 256 colors is previously defined. In the first example the digital image is a two-dimensional array whose elements are sets of three bytes. In the second example each element is a single byte. However, other possibilities do exist. For instance, an additional byte may be added in both cases to manage a gray level.

The invention is a process for producing the graphic pattern for a display device of the prior art, like the one just described, to exhibit to moving observers a movie picture of a large number $N_{frames}$ of digital frames. The input frames are labeled by a common name and a correlative number. The long display panel is composed of $N_{pages}$ modular units and the lenticular plate of each unit has $N_{lenses}$ cylindrical lenses. These numbers are not necessarily commensurate. The first input is the choice of the width w and height H, in pixel units, of the fringes of the graphical pattern, and the period p, defined as the distance in pixels between the central lines of two adjacent fringes ($p \geqq w$). These values will determine the final resolution of the optically amplified image that will be displayed to the viewers.

Following the program commands the Processing Unit accomplishes the following sequence of operations:

1. Creates an integer variable q, able to assume all the values 1, 2, . . . , $N_{pages}$, or, alternatively, any other correlative succession of $N_{pages}$ elements. This index enumerates the different pages. The first value is assigned to q (for example, q=1).

2. Creates a two-dimensional byte array of size $(N_{lenses}p)\times H$ and configures its elements to establish a background color. The array is labeled with a common name followed by the correlative index q (for example, page-q).
3. Defines an integer variable j, able to assume a succession of $N_{lenses}$ correlative values, for instance, j=1, 2, . . . , $N_{lenses}$. This index enumerates the fringes of a page. The first value is assigned to j (for example, j=1).
4. Calculates the number n(q,j) of frames that have completed their repeated fringes when the j-th fringe of page q is being constructed. For instance, if the viewer is expected to travel at relatively uniform velocity then $N_{rep}$ is constant and n(q,j) is given by the simple equation $$n(q,j)=Int[((q-1)N_{lenses}+j-1)/N_{rep}],$$

where the function Int(x) assigns to the rational number x its integral part.

If the observation speed varies significantly then $N_{rep}$ should be adjusted for each value of q. Each value of q is associated with a modular unit of the panel, which has a definite position in the path of the viewers. In this way, each q is associated with a speed value, and hence with a number $N_{rep}(q)$, which becomes a function of q. In this case, a data file establishing the correspondence between q and $N_{rep}(q)$, or equivalently, the velocity profile of the observers, becomes necessary as an input element. Under the not too restrictive condition $N_{rep}(q)\leqq N_{lenses}$ $$n(q,j)=\sum_{q'=1}^{q-1}\left\{\mathrm{Int}\left[\frac{N_{lenses}-Res(q'-1)}{N_{rep}(q')}\right]+\theta(Res(q'-1))\right\},$$

where θ(x)=1 for x>0 and θ(0)=0. Res(q) is the residual number of fringes of page q that have not completed the $N_{rep}$ repetitions, which can be evaluated using the recursive relation $$Res(q'-1)=\left\{1-\mathrm{Frac}\left[\frac{N_{lenses}-Res(q'-2)}{N_{rep}(q'-1)}\right]\right\}N_{rep}(q'-1)$$

and Frac(x) is the fractional part of x.

5. Creates a label combining the common name of the digital movie frames (for example, frame) with the number n(q,j) and recalls the digital image frame-n(q,j).
6. Opens a resizing sub-routine, which resizes the digital image frame-n(q,j) to a strip of size w×H. The resizing sub-routine is not necessarily included in the program of the invention, but may be a part of a standard commercial graphic program, which can be opened and operated by a virtual keyboard to accomplish the job.
7. Divides the byte array page-q into $N_{lenses}$ equivalent sectors of width p along the principal direction. The resized digital strip is pasted on the j-th sector of the page-q byte array. The pasting operation simply consists in copying the byte configuration of the elements of the pasted array into the corresponding elements of the other array. Though this is a simple operation it may be realized using a standard sub-routine.
8. Replaces the value of j by the next value of the succession and the command sequence returns to the step 4. If there is no next value (if, for example, $j>N_{lenses}$) the sequence continues to step 9.
9. Generates a small digital figure displaying the number q and pastes it in a convenient area of the page-q array to identify its sequential order when printed. The page-q array is stored in the storage device as a digital image.
10. Replaces the value of q by the next value of the succession and the command sequence returns to the step 2. If there is no next value (if, for example $q>N_{pages}$) the procedure ends.

Figure 4:
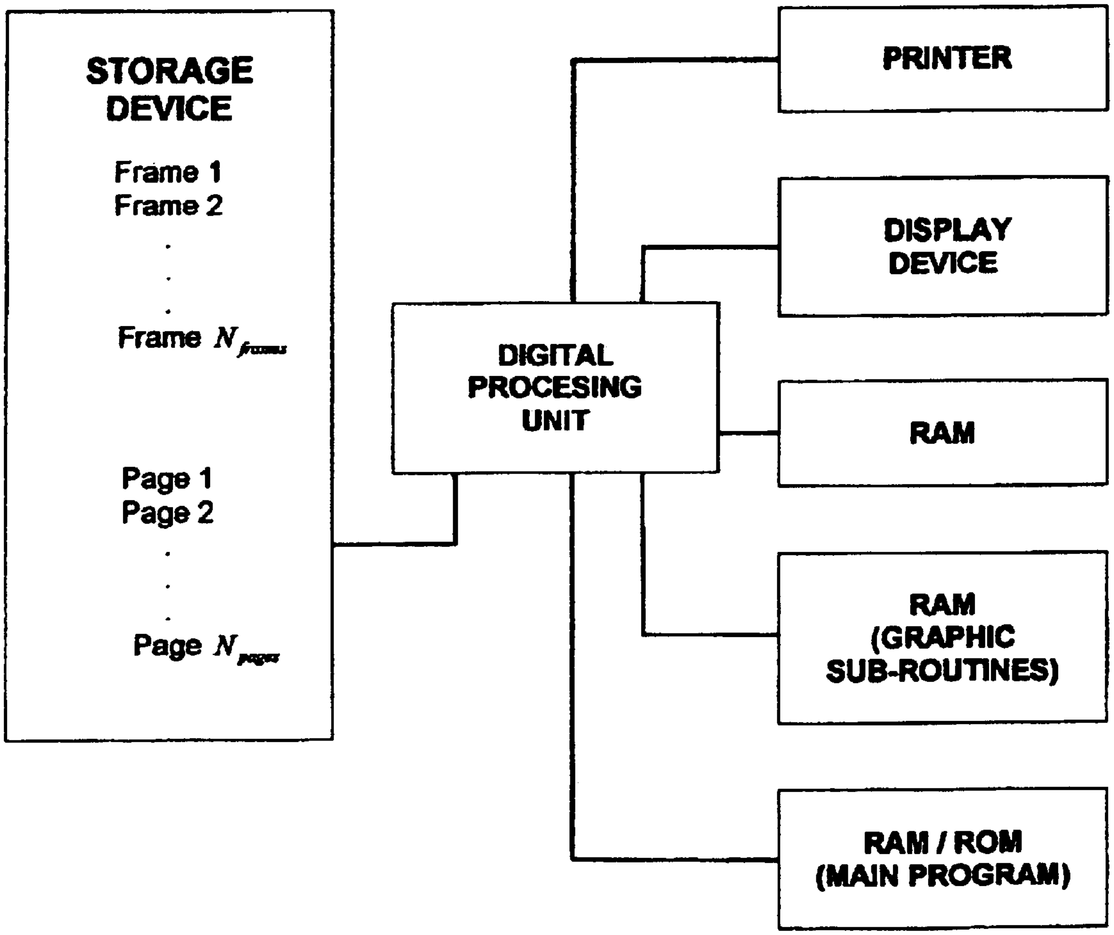
FIG. 4 depicts a block diagram for the device. Lines represent data, control and addressing connections, interfaces are implicit.

FIG. 4 shows a block diagram of a device for the generation of printed images which define the graphic patterns to be used in graphic information exhibiting panels of the type made of a plurality of cylindrical converging lenses arranged parallel each other. The device comprises a personal computer (PC), including an interface to communicate with the computer by an expanding bus; a central processing unit (CPU); and associated read-only-memory (ROM) or random access memory (RAM) accommodating a program, or set of operations as described above, necessary for the device to be able to generate the graphic patterns. The different instructions are read by the CPU. The CPU is also connected to an interface circuit for memories, through transfer conductors of control signals, data-reading and writing signals and addressing signals. The interface for the memories is linked with blocks of random-access-memories (RAM) associated with the storage of the data blocks of the images to be exhibited, intermediate digital blocks produced by the own calculations and processes of the system, temporary data generated in different calculation operations and digital data blocks of the resulting pattern pages. The information stored in this RAM unit can be read through video interface circuits and, eventually, through interface circuits for printing means. Another interface circuit allows the CPU to transfer information between the RAM and a high capacity digital storage device for storing the input movie frames and resulting graphic pattern pages in digital code.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A method for generating printed images of a graphic pattern of a movie picture to be displayed for moving observers using a long display panel composed of said graphic pattern and a plate made up of a plurality of cylinder converging lenses arranged parallel to each other with a common focal plane, comprising:

a) storing a succession of digital data blocks corresponding to individual frames in digital code of the movie picture to be displayed and assigning a label to each of these digital data blocks that identifies its position in a cinematographic sequence;

b) defining an integer variable q which can assume $N_{pages}$ values, where initially q is set to its first value, where each page is a printed unit of the graphic pattern and $N_{pages}$ is the total number of pages of the graphic pattern;

c) generating a two-dimensional array of byte sets, able to be recognized as a blank image in a definite digital graphical format, of size $(N_{lenses}p)\times H$, where the array can be thought of as formed by $N_{lenses}$ adjacent sectors of size p×H (hereafter, fringes) and is labeled by a name (page-) together with the correlative number q, where $N_{lenses}$ is the number of lenses in the lenticular plate, p is the distance between fringes in the graphic pattern, and H is the height of a fringe;

d) calling successively and resizing on calling the data blocks, or byte arrays representing the movie frames in digital format by a graphical resize sub-routine to a size w×H, in array or pixel units, where $w \leqq p$, where each time a frame is called and resized it is pasted repeatedly in $N_{rep}$ consecutive fringes of the page-q array, where w is the size in the principal direction of a fringe;

e) once the $N_{lenses}$ fringes of the page-q array are all filled by resized frames, closing the array and storing as a digital image, replacing the value of q with the next value in the succession, if available, and the process returns to step c), and if step e) occurs before the pasting of the $N_{rep}$ resized copies of a frame is completed, the preparation of the next page will start pasting the residual copies to complete the $N_{rep}$ ones, where $N_{rep}$ is number of repetitions of the fringes associated with each frame of the movie picture;

f) eventually, pasting a small identification image containing the number q before closing and storing the page-q array;

g) if no next value of q is available in the succession of $N_{pages}$ elements the process does not return to step c), but ends.

2. A method as in claim 1 wherein the integer number $N_{rep}$ is constant and chosen so that the successive movie frames are replaced at the right rate for a given speed of the viewers.

3. A method as in claim 1 wherein the integral number $N_{rep}$ is variable and calculated from a given speed profile of the viewers, in order that the successive movie frames can be replaced at the right rate for viewers moving at non-uniform speed.

4. A computer for the generation of printed images which define graphic patterns to be used in graphic information exhibiting panels of the type made of a plurality of cylindrical converging lenses arranged parallel each other, wherein said computer is programmed with the method of claim 1.

5. A computer for the generation of printed images which define graphic patterns to be used in graphic information exhibiting panels of the type made of a plurality of cylindrical converging lenses arranged parallel each other, comprising:

a) a central processing unit (CPU);

b) first memory operably associated with said CPU, including a program in accordance with claim 1 for generating the graphic patterns;

c) a second memory for storage of the data blocks of the images to be exhibited, intermediate digital blocks produced by the own calculations and processes of the system, temporary data generated in different calculation operations and digital data blocks of the resulting pattern pages; and d) a high capacity digital storage device for storing the input movie frames and resulting graphic pattern pages in digital code from said second memory.

6. A printed pattern to be used in graphic exhibiting panels of the type made up of a plurality of cylindrical converging lenses which are arranged parallel to each other, and obtained through the method of claim 1.

7. A printed pattern to be used in graphic exhibiting panels of the type made up of a plurality of cylindrical converging lenses which are arranged parallel to each other, and obtained through the device of claim 5.

* * * * *